Figure 1:
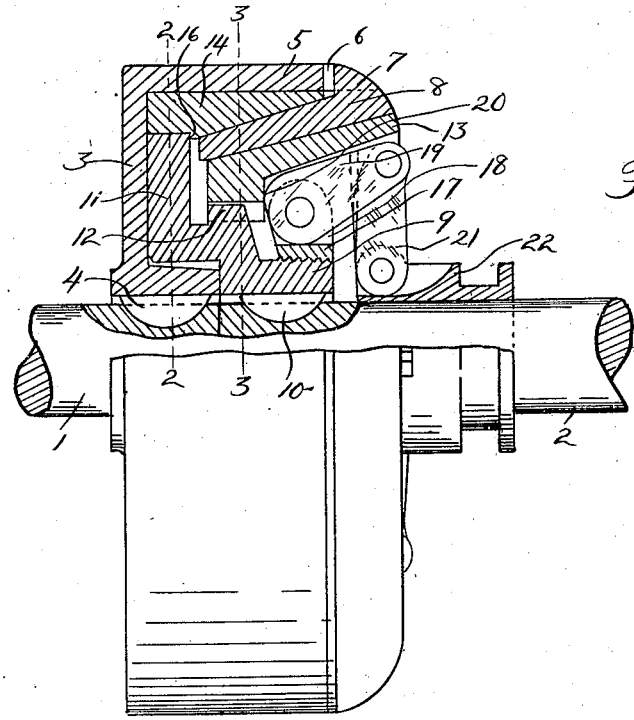

Nov. 27, 1923.  1,475,564
V. COLLIAU
CLUTCH
Filed July 23, 1921  2 Sheets-Sheet 1

Inventor
Victor Colliau

By Whittemore Hulbert Whittemore
+Belknap.  Attorneys

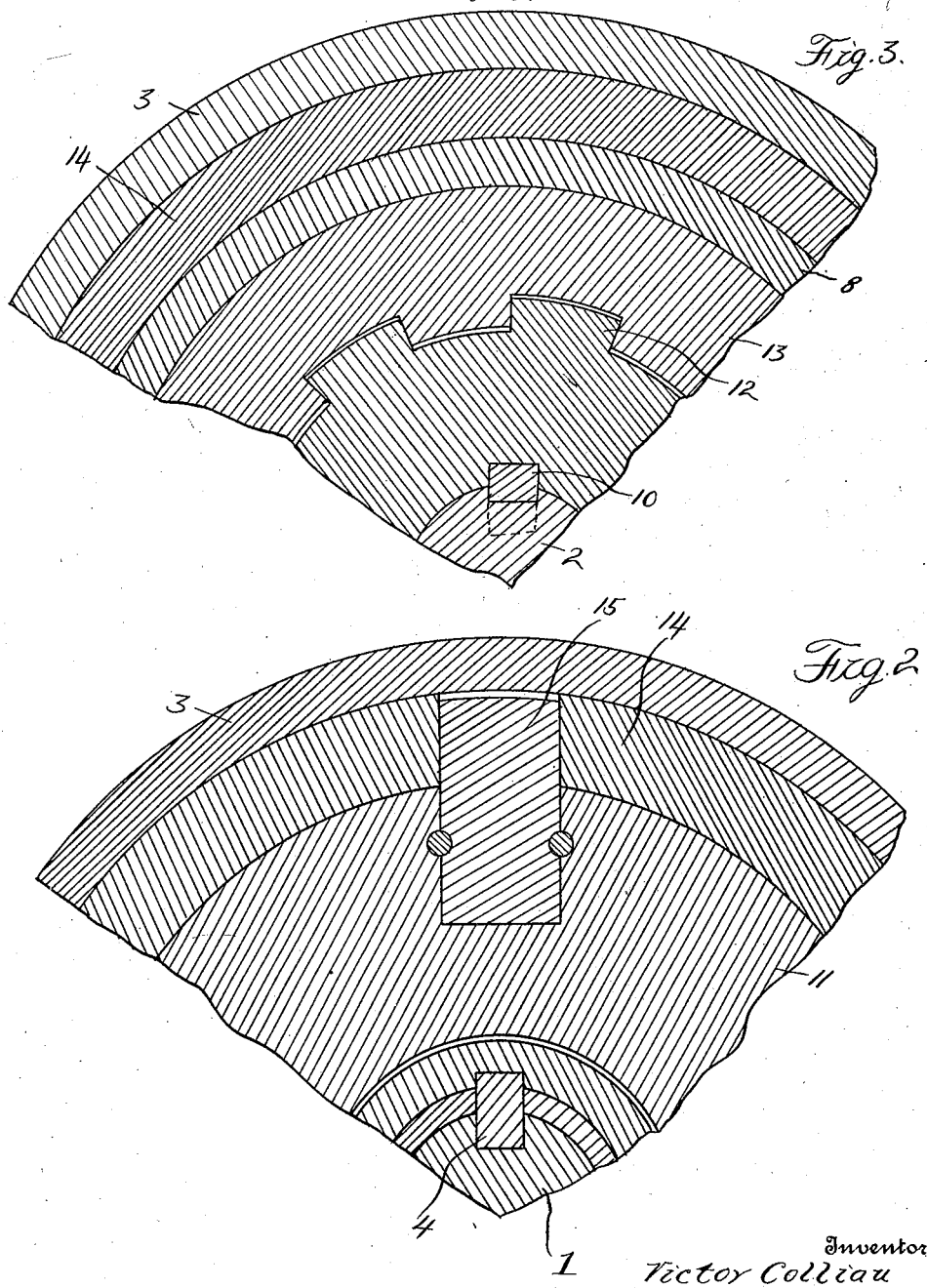

Patented Nov. 27, 1923.

1,475,564

UNITED STATES PATENT OFFICE.

VICTOR COLLIAU, OF DETROIT, MICHIGAN, ASSIGNOR TO STANDARD GEAR COMPANY, OF DETROIT, MICHIGAN, A CORPORATION OF MICHIGAN.

CLUTCH.

Application filed July 23, 1921. Serial No. 486,960.

*To all whom it may concern:*

Be it known that I, VICTOR COLLIAU, a citizen of the United States of America, residing at Detroit, in the county of Wayne and State of Michigan, have invented certain new and useful Improvements in Clutches, of which the following is a specification, reference being had therein to the accompanying drawings.

The invention relates to clutches of the friction type and has for its object the provision of a clutch which is compact and of relatively light weight and which will effectively drive a driven member from a driving member to which high power is applied. The invention has for other objects the novel features of construction and combinations and arrangements of parts as more fully hereinafter set forth.

Figure 4:
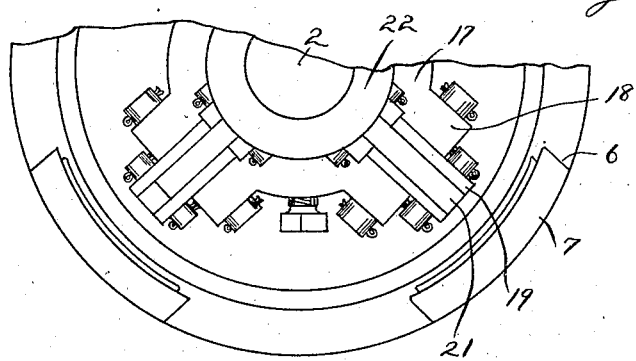

In the drawings:

Figure 1 is a longitudinal sectional elevation of a clutch embodying my invention;

Figures 2 and 3 are cross sections on the lines 2—2 and 3—3 respectively of Figure 1;

Figure 4 is an end view thereof.

The invention is applicable particularly to boats for connecting the propeller shaft to the engine crank shaft, factory shafting and the like, and is designed so that it is powerful in operation and will frictionally secure the driven member to the driving member to rotate therewith, even when the driving member is propelled under high power. In detail, 1 is the drive shaft, 2 the driven shaft, and 3 a drum secured to the drive shaft 1 by suitable means, such as the key 4. This drum has the cylindrical flange 5, the end of which has the slots 6 cut therein for engagement with correspondingly shaped teeth or projections 7 upon the outer cone 8 whereby the outer cone will be rotated with the drum. 9 is the driven hub which is secured to the driven shaft 2 as by the key 10. This hub is arranged within the drum 3 and has the end flange 11 and the intermediate splined or toothed portion 12 for engagement with a similarly shaped portion upon the inner cone 13, the outer face of which extends adjacent to the inner face of the outer cone. With this arrangement, the inner cone is nonrotatably secured to the driven hub.

14 is a transversely split expanding ring which is positioned in the space inclosed by the cylindrical flange 5 of the drum, the outer cone 8, the end flange 11 of the driven hub and the end of the drum. This expanding ring is nonrotatably secured to the driven hub 9 as by means of the key 15 and the expanding ring has the shoulder 16 adapted to engage the end flange 11 of the driven hub upon actuation of the operating mechanism to expand the ring. This shoulder being at right angles to the longitudinal axis of the drum and driven hub prevents any wedging action taking place between the expanding ring and the drum or driven hub.

17 is a toggle carrier which is adjustably secured upon the driven hub 9 as by threadedly engaging the same. This toggle carrier has the bifurcations 18 to which are pivoted the links 19, the inner end portions 20 of which are cammed to engage the outer face of the flange at the inner end of the inner cone 13 to move the inner cone longitudinally relative to the driven hub. The outer ends of the links 19 are pivotally connected to the links 21 which latter are also pivoted to the toggle spool 22 which is adapted to be moved longitudinally upon the driven shaft 2 by suitable means (not shown). The links 19 and 21 form toggle links and consequently, the mechanism has very great leverage in expanding the expanding ring 14.

In operation, to drive the driven shaft 2 from the driving shaft 1, the toggle spool 22 is moved inwardly upon the driven shaft 2 to the position as indicated in Figure 1, and through the toggle links 19 and 21 with the cam surfaces 20 upon the toggle links 19 moves the inner cone 13 inwardly upon the driven hub 9, which inner cone engaging the outer cone moves the latter inwardly. This outer cone in turn engaging the expanding ring 14, moves the latter inwardly until the shoulder 16 abuts the transverse end flange 11 upon the driven hub when the expanding ring then expands radially outward and firmly engages the cylindrical flange 5 of the drum. Upon the completion of these steps, the driving takes place from the driving shaft 1 to the driven shaft 2 through the drum 3, outer cone 8, by means of its teeth or projections 7 engaging in the slots 6, inner cone 13 and driven hub 9 by means of the splined or toothed portion 12 upon the driven hub and the cooperating portion upon the inner cone. Also the driving takes place through the drum 3, expanding ring 14, outer cone 8, inner cone 13, and driven hub 12. Further, the driving takes place through the drum 3, expanding ring 14, and the end flange 11 of the driven hub 9, which end flange is keyed to the expanding ring 14.

The expanding ring 14 while being non-rotatably secured to the driven hub is free to expand perfectly and engage the entire inner surface of the flange 5 of the drum 3. When not expanded this ring is supported entirely by the driven hub and makes no contact with the flange of the driving drum. Furthermore, the angles of inclination of the frictional engaging surfaces of the expanding ring and outer and inner cones are such that upon longitudinally moving the toggle spool 22 to disengaging position, the frictional engaging surfaces will automatically disengage.

From the above description, it will be readily seen that extensive frictional driving surfaces are provided so that the clutch will take care of the application of high power. Moreover, the clutch is compact and therefore of relatively light weight. Still another important feature is that the clutch is controlled by toggle links which are very powerful in operation and will assure firm frictional engagement of the cooperating parts. These toggle links are arranged so that they will be slightly off-center when the toggle spool has been moved inwardly to engaging position whereby the frictional engaging surfaces of the clutch will be held in engagement with each other until the toggle spool is adjusted longitudinally outward to disengaging position.

What I claim as my invention is:

1. In a clutch, the combination with a driving shaft and a drum thereon having a cylindrical flange, of a driven shaft, an expanding ring within said drum and adapted to engage the inner face of said cylindrical flange, said expanding ring having a wedge shaped portion, an outer cone engageable with said wedge shaped portion, an inner cone nonrotatably secured to said driven shaft and adapted to move said outer cone longitudinally of said driven shaft, and means for actuating said inner cone to move said outer cone to expand said expanding ring.

2. In a clutch, the combination with a driving shaft, and a drum mounted thereon having a cylindrical flange, of a driven shaft, a driven hub upon said driven shaft having an end flange, an expanding ring having its outer face adapted to engage the inner face of said cylindrical flange, said expanding ring comprising an annular portion engaging in the space between the periphery of said end flange and the inner face of said cylindrical flange, and also a wedge shaped portion with a transverse shoulder between said wedge shaped and annular portions adapted to engage the outer side of said end flange, and means engageable with the wedge shaped portion of said expanding ring for expanding said expanding ring and for driving said driven shaft from said expanding ring.

3. In a clutch, the combination with a driving shaft and a drum thereon, having a cylindrical flange, of a driven shaft, a driven hub upon said driven shaft, an expanding ring adapted to engage the inner face of said cylindrical flange and nonrotatably secured to said driven hub, an outer cone adapted to frictionally engage the inner face of said expanding ring and nonrotatably secured to said cylindrical flange, an inner cone nonrotatably secured to said driven hub and adapted to frictionally engage the inner face of said outer cone, and means for adjusting said parts to frictionally engage their friction surfaces.

4. In a clutch, the combination with a driving shaft and a drum thereon with a cylindrical flange, of a driven shaft, a driven hub upon said driven shaft, an expanding ring within said drum and adapted to frictionally engage the inner face of said cylindrical flange, said ring being non-rotatively secured to said driven hub, an outer cone adapted to frictionally engage the inner surface of said expanding ring, an inner cone adapted to frictionally engage the inner face of said outer cone, said inner cone being longitudinally slidably mounted upon said driven hub and nonrotatably secured thereto, and means longitudinally adjustably mounted upon said driven hub for adjusting said inner cone longitudinally of said driven hub.

5. In a clutch, the combination with a driving shaft and a drum mounted thereon having a cylindrical flange, of a driven shaft, a driven hub upon said shaft having a transverse end flange, an expanding ring adapted to frictionally engage the inner face of said cylindrical flange and nonrotatably secured to said transverse end flange, an outer cone nonrotatably secured to said cylindrical flange and adapted to frictionally engage the inner face of said expanding ring, an inner cone nonrotatably mounted upon said driven hub but longitudinally slidably engageable therewith, said inner cone being adapted to frictionally engage the inner face of said outer cone, a carrier threadedly engaging said driven hub, a cam member pivotally mounted upon said carrier and adapted to engage said inner cone to longitudinally adjust the same relative to said driven hub, a spool slidably mounted upon said driven shaft, and a link pivotally connected to said spool and to said cam member for actuating the latter upon the longitudinal movement of the former.

6. In a clutch, the combination with a driving shaft and a drum thereon having a cylindrical flange, of a driven shaft, an expanding ring within said drum and adapted to engage the inner face of said cylindrical flange, said expanding ring having a wedge-shaped portion, an outer cone engageable with said wedge-shaped portion, an inner cone engageable with said outer cone and movable longitudinally of said driven shaft, a driving connection between said inner cone and said driven shaft, and means for actuating said inner cone to move said outer cone to expand said ring.

7. In a clutch, the combination with a driving shaft and a driven shaft, of a drum non-rotatively mounted on said driving shaft, a hub non-rotatively secured to said driven shaft, a slidable expanding ring non-rotatively mounted on said hub and adapted to frictionally engage said drum, said ring having means adapted to engage said hub to limit its sliding movement preliminary to the expansion thereof, and means for sliding said ring and for subsequently expanding the same.

8. In a clutch, the combination with a driving shaft and a driven shaft, of a drum non-rotatively mounted on said driving shaft, a hub non-rotatively secured to said driven shaft, a slidable expanding ring non-rotatively mounted on said hub and adapted to frictionally engage said drum, said ring having a shoulder adapted to engage said hub to limit its sliding movement preliminary to the expansion thereof, and means for sliding said ring and for subsequently expanding the same.

9. In a clutch, the combination with a driving shaft and a driven shaft, of a drum non-rotatively mounted on said driving shaft, a hub non-rotatively mounted on said driven shaft, an expanding ring non-rotatively mounted on said hub and adapted to frictionally engage said drum, a member adapted to expand said ring to grip said drum, said member having means adapted to engage said drum whereby said member will be rotated with the drum, and means for actuating said member.

10. In a clutch, the combination with a driving shaft and a driven shaft, of a drum non-rotatively mounted on said driving shaft, a hub non-rotatively mounted on said driven shaft, an expanding ring non-rotatively mounted on said hub and adapted to frictionally engage said drum, a member adapted to expand said ring to grip said drum, said drum having a recess therein, said member having a projection adapted to engage the recess in said drum whereby said member will be rotated with said drum, and means for actuating said member.

In testimony whereof I affix my signature.

VICTOR COLLIAU.